United States Patent
Younse

(10) Patent No.: US 7,012,533 B2
(45) Date of Patent: Mar. 14, 2006

(54) OCCUPANT DETECTION AND NOTIFICATION SYSTEM FOR USE WITH A CHILD CAR SEAT

(76) Inventor: Jack M. Younse, 602 Sabine Ct., Allen, TX (US) 75013

( * ) Notice: Subject to any disclaimer, the term of this patent is extended or adjusted under 35 U.S.C. 154(b) by 120 days.

(21) Appl. No.: 10/658,954

(22) Filed: Sep. 11, 2003

(65) Prior Publication Data
US 2005/0057350 A1 Mar. 17, 2005

(51) Int. Cl.
G08B 23/00 (2006.01)
B60R 22/00 (2006.01)

(52) U.S. Cl. .................. 340/573.1; 340/457; 340/449; 340/667; 180/273; 280/735; 701/45

(58) Field of Classification Search ................ 340/457, 340/573.1, 573.4, 667; 297/250.1; 180/273; 701/45; 280/735
See application file for complete search history.

(56) References Cited

U.S. PATENT DOCUMENTS

| | | | | |
|---|---|---|---|---|
| 4,979,777 A | * | 12/1990 | Takada | .................... 297/250.1 |
| 5,260,684 A | | 11/1993 | Metzmaker | |
| 5,802,479 A | | 9/1998 | Kithil et al. | |
| 5,983,147 A | | 11/1999 | Krumm | |
| 6,024,378 A | | 2/2000 | Fu | |
| 6,028,509 A | * | 2/2000 | Rice | ........................... 340/449 |
| 6,329,914 B1 | | 12/2001 | Shieh et al. | |
| 6,480,103 B1 | | 11/2002 | McCarthy et al. | |
| 6,714,132 B1 | * | 3/2004 | Edwards et al. | ......... 340/573.1 |
| 6,812,844 B1 | * | 11/2004 | Burgess | .................... 340/573.1 |
| 2002/0089157 A1 | * | 7/2002 | Breed et al. | ................. 280/735 |
| 2002/0161501 A1 | * | 10/2002 | Dulin et al. | .................... 701/45 |
| 2003/0062996 A1 | * | 4/2003 | Flanagan et al. | ........... 340/457 |
| 2003/0222775 A1 | * | 12/2003 | Rackham et al. | ........... 340/457 |
| 2004/0113797 A1 | * | 6/2004 | Osborne | ................... 340/573.4 |

* cited by examiner

Primary Examiner—Jeffery Hofsass
Assistant Examiner—Anne V Lai
(74) Attorney, Agent, or Firm—Jack M. Younse

(57) ABSTRACT

A child car seat with a built-in cushion switch that closes when the seat is occupied. Also, push type switches are added to at least one of the vehicle's side passenger doors with signals being routed to a micro-controller unit, which determines when the car seat is occupied AND when one of the doors is open and enables the vehicle's internal beeper alarm, thereby reminding any occupants exiting the vehicle that a child is strapped in the back seat. Additionally, an inside temperature sensor is coupled to the micro-controller unit, which sets off a loud external alarm such as the vehicle's security alarm, when the temperature inside the vehicle goes above or below a safe preprogrammed environmental range. This is an additional safety feature that will get the attention of people outside the vehicle, indicating that a child is trapped in a dangerous environment inside the vehicle and needs help.

11 Claims, 5 Drawing Sheets

OCCUPANT DETECTION AND NOTIFICATION SYSTEM FOR USE WITH A CHILD CAR SEAT

BACKGROUND OF THE INVENTION

1. Field of the Invention

The present invention relates to a child safety system for use in connection with detecting a child fastened in a car seat. The occupant detection and notification system has particular utility in connection with reminding occupants getting out of a vehicle that there is a child fastened in a car seat inside the vehicle.

2. Description of the Prior Art

In these times there are more and more tragic incidences of busy parents, daycare workers, and other adults in a hurry or in a preoccupied state of mind, getting our of their car and forgetting that a baby or small child is strapped in the car seat in the backseat of the car. Such events can change the lives of a family permanently. For a reasonably low cost, car seats can be equipped with a notification system that will get a responsible adult's attention when leaving a vehicle, thereby preventing such accidents from occurring.

The use of warning systems and car seat safety devices are known in the prior art. For example, U.S. Pat. No. 5,260,684 to Metzmaker discloses a warning system for a child's restraining seat for use in a passenger vehicle that includes an occupancy indicator, an emergency signal, and warning indicators. A vibration sensor actuates the warning system in the event of an accident to notify people outside the vehicle that there is an occupant inside. However, the Metzmaker '684 patent discloses a device that is different in structure from the present invention and does not actuate the system inside the vehicle when the driver's door and/or other doors are opened to indicate that there is a child onboard.

U.S. Pat. No. 6,024,378 to Fu discloses a vehicle seat assembly including at least one occupant sensing system used in headrest adjustment and/or air bag actuation systems that includes an array of pressure transducers located in the seat cushion, back cushion, and headrest to prevent air bag deployment when the controller determines that the vehicle seat is unoccupied or is occupied by a rear-facing child car seat. However, the Fu '378 patent also discloses a device that is different in structure from the present invention and does not actuate the system inside the vehicle when the driver's door and/or other doors are opened to indicate that there is a child onboard.

Similarly, U.S. Pat. No. 6,329,914 to Shieh, et al. discloses a thickness measurement detection system for use in vehicle occupant detection, which utilizes an oscillation circuit that causes an antenna electrode to emit an electric field that is disrupted by the electrical characteristics of an object placed on the seat. However, the Shieh '914 patent is different in structure from that of the present invention and does not disclose a system that sets off a notification signal when a child is positioned in a child car seat and at least one vehicle door is opened, as would be the case when an adult is exiting the vehicle.

Also, U.S. Pat. No. 5,983,147 to Krumm discloses a video occupant detection and classification system that determines when it is not safe to arm a vehicle airbag by storing representations of known situations as observed by a camera at a passenger seat. However, the Krumm '147 patent is different in both function and structure from that of the present invention and does not actuate the system when the driver's door and/or other doors are opened to indicate that there is a child onboard.

Lastly, U.S. Pat. No. 5,802,479 to Kithil et al. and U.S. Pat. No. 6,480,103 to McCarthy et al. disclose apparatus that may be of general interest and pertinent to the construction and design of the present invention. The Kithil '479 patent discloses a motor vehicle occupant sensing systems that uses a roof-mounted sensor array of capacitive coupling passenger position sensors. The McCarthy '103 patent discloses a system for sensing ambient conditions in a compartment, such as the trunk of an automobile, and generates a control signal in response to the sensed conditions. However, both of theses patents are different in both function and structure from that of the present invention and neither discloses a system that sets off a notification signal when a child is positioned in a child car seat and at least one vehicle door is opened, as would be the case when an adult is exiting the vehicle.

While the above-described devices fulfill their respective, particular objectives and requirements, the aforementioned patents do not describe an occupant detection and notification system for use with a child car seat that reminds a responsible person that there is a child onboard.

Therefore, in this fast paced society, where in the year 2003 through the month of August it's reported that 36 children have died from heat exhaustion in automobiles, a need exists for a new occupant detection and notification system that can be used to get a persons attention when a child is in a child car seat and a vehicle door is opened, thereby reminding such person exiting the vehicle that there is an onboard child strapped in a car seat. Almost unbelievably, it is also reported that slightly less than 2% of these deaths are cause by people deliberately leaving a child in a car. So there is also a need for a system that will alert passersby in the vicinity to come to the rescue of a child left in a car, for whatever reason, when the inside temperature reaches life threatening levels, either too hot or too cold. In this regard, the present invention substantially fulfills these needs. In this respect, the occupant detection and notification system according to the present invention substantially departs from the conventional concepts and designs of the prior art, and in doing so provides an apparatus primarily developed for the purpose of preventing a baby or child from being left in a vehicle where the temperature may quickly reach life threatening extremes.

SUMMARY OF THE INVENTION

In view of the foregoing disadvantages inherent in the known types of vehicle occupant detection systems now present in the prior art, the present invention provides an improved occupant detection and notification system, and overcomes the above-mentioned disadvantages and drawbacks of the prior art. As such, the general purpose of the present invention, which will be described subsequently in greater detail, is to provide a new and improved occupant detection and notification system that has all the advantages of the prior art mentioned heretofore and other novel features that result in an occupant detection and notification system that is not anticipated, rendered obvious, suggested, or even implied by the prior art, either alone or in any combination thereof.

To attain this, the present invention essentially comprises a child's car seat that has a seat cushion with a built-in switch that closes when the seat is occupied. Additionally, push type switches are added to one or more of the vehicle's side passenger doors including at least the driver's door. Signals from these switches are routed to a micro-controller unit, which determines when the car seat is occupied AND when at least one door is open and enables an internal beeper alarm or optional voice command, such as 'child onboard.' Power and ground for the system are obtained from the vehicles electrical system to avoid any possibility of weak batteries, which could cause the system to be inoperable. This system will remind any responsible person leaving the vehicle that a child is strapped in the back seat.

Additionally, an inside temperature sensor can be coupled to the micro-controller, which sets off a loud external alarm, such as the vehicle's security alarm, when the temperature inside the vehicle goes above or below a preprogrammed safety range. This is an additional safety feature that will get the attention of people outside or passing by the vehicle that a child is trapped in a dangerous environment inside the vehicle and needs immediate help.

This system can be supplied as a retrofit kit for installation in existing vehicles. Preferably, for a relatively low cost, vehicle manufacturers could provide a cable accessible in the vicinity of the rear seat with signals to or from such equipment as door switches, input to the internal beeper and external security alarm, internal temperature sensor, power, and ground. Similarly, car seat manufactures could provide a seat switch and connector and possibly even the micro-controller unit. Ultimately, the vehicle manufacturers could also include the micro-controller functions, which may consist of a microprocessor or other digital micro-controller so that only the car seat switch would need to be plugged into an available cable connector.

In use, a child is strapped in a car seat in the backseat of a vehicle and nothing happens for a predetermined period (delay time) while the driver gets in the car and the doors are shut, at which time the system is enabled. When the vehicle has reached its destination and at least the driver's door is opened, a beeper or voice is heard to remind the driver (or passengers) that a child is onboard so that they will be sure to safely remove him/her from the vehicle. The notification signal stops when either the child is moved from the car seat or when all doors are shut. However, if for whatever reason the child is left in the vehicle and the temperature reaches an unsafe level, either too hot or too cold, a loud external alarm will sound until someone comes to the child's aid.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved occupant detection and notification system that provides in the apparatuses and methods of the prior art some of the advantages thereof, while simultaneously overcoming some of the disadvantages normally associated therewith.

It is another object of the present invention to provide a new and improved occupant detection and notification system that may be easily and efficiently manufactured and marketed.

An even further object of the present invention is to provide a new and improved occupant detection and notification system that has a low cost of manufacture with regard to both materials and labor, and which accordingly is then susceptible of low prices of sale to the consuming public, thereby making such safety equipment economically available to the buying public.

And it is an object of the present invention to provide a new and improved occupant detection and notification system that vehicle manufacturers can primarily implement with already existing components.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
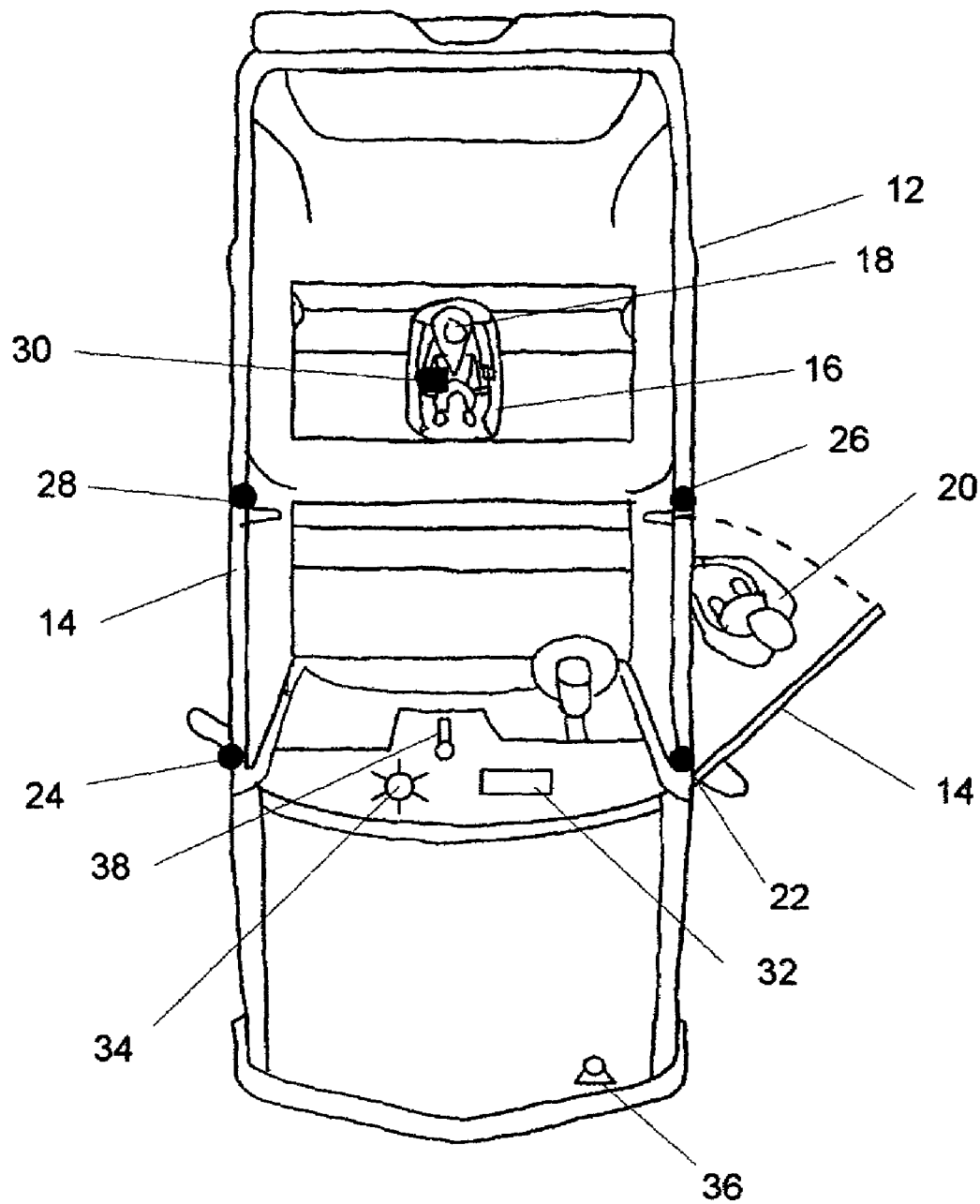
FIG. 1 is a top view of the preferred embodiment of the occupant detection and notification system constructed in accordance with the principles of the present invention.

Referring now to the drawings, and particularly to FIGS. 1–8, a preferred and other embodiments of the occupant detection and notification system of the present invention are shown and generally designated by the reference numeral 10.

In FIG. 1, a preferred embodiment of the occupant detection and notification system 10 constructed in accordance with the principles of the present invention are illustrated and will be described. More particularly, the occupant detection and notification system 10 is comprised of a vehicle 12 having two or more passenger doors 14, where adults 20 enter and exit the vehicle, with each door having a door switch (four shown) 22–28. One or more typical child car seat(s) 16 are installed in the rear seat of the vehicle. An unique aspect of the car seat is a cushion pressure switch 30, either built-in to the car seat or retrofitted to the seat, such that it is enabled when the car sear is occupied by a child 18. The occupant detection and notification system 10 further comprises a micro-controller unit 32, an internal vehicle alarm (beeper) 34, an external vehicle (loud security type) alarm 36, and an inside temperature sensor 38.

Figure 2:
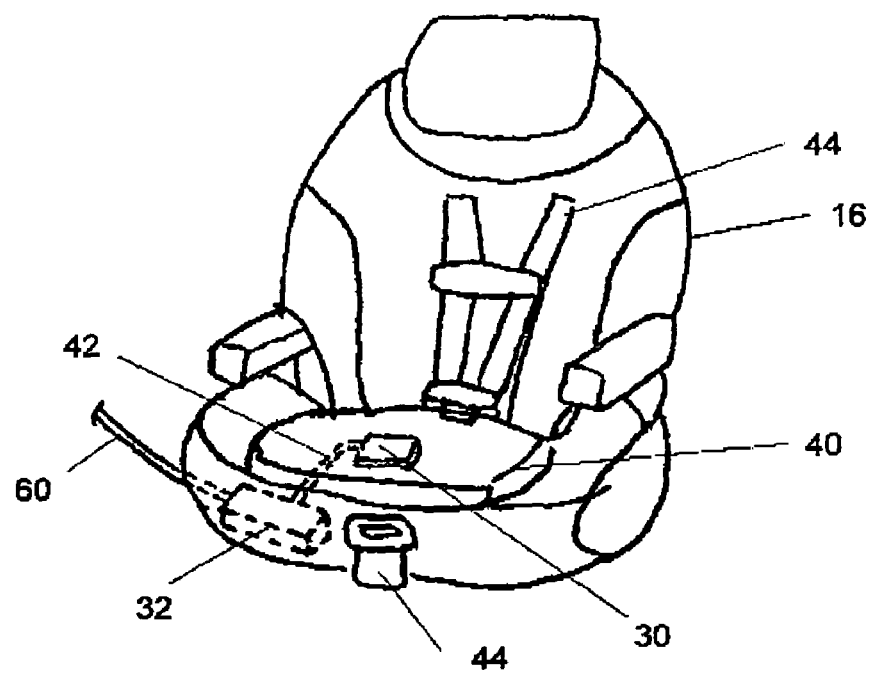
FIG. 2 is a perspective view of a car seat equipped with a seat cushion with a built-in pressure switch and a micro-controller unit of the present invention.

FIG. 2 shows a perspective view of a child car seat 16 of the type needed for use with the present invention. The child car seat 16 has typical locking seat belts 44, a car seat cushion 40 with built-in pressure switch 30, a micro-controller unit 32, a cushion switch cable 42 coupled to the micro-controller unit 32, and a cable harness 60 for connecting the system to other input/output components in the vehicle. The seat cushion with pressure switch can either be built into the child car seats by the manufacturer or can be a separate item that can be attached to existing child car seats. In operation, the seat cushion pressure switch 30 is enabled only when the child car seat is occupied.

Figure 3:
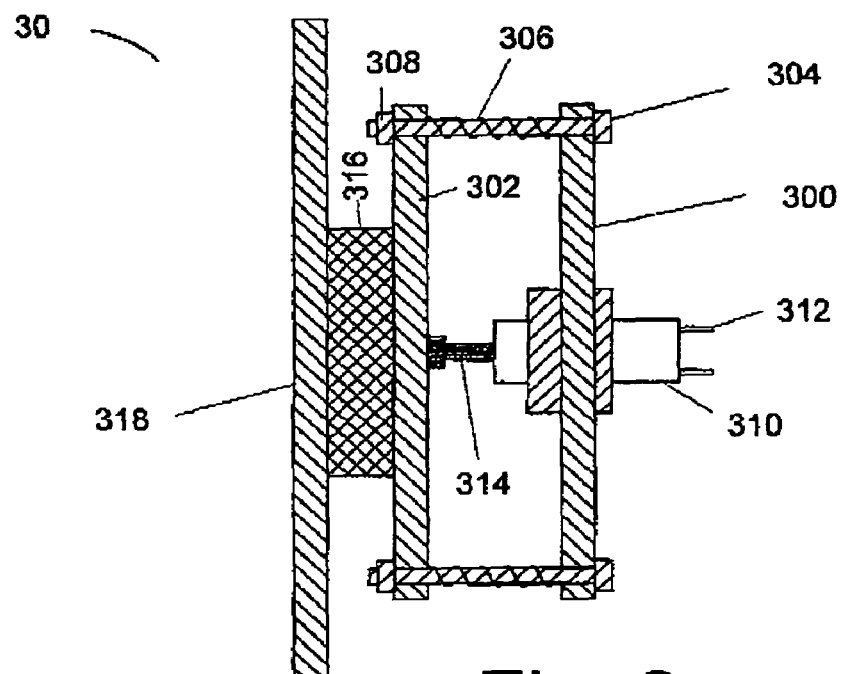
FIG. 3 is a cross-sectional drawing of a pressure switch that can be used in the occupant detection and notification system of the present invention.

FIG. 3 is a cross-sectional drawing of a seat cushion pressure switch 30 showing the functional requirements of the switch needed for use in the occupant detection and notification system of the present invention. Various types of switches can be used for this purpose. In this prototype switch, which is mounted inside a separate seat cushion, a normally open push button 314 switch 310 is shown mounted on a switch mounting plate 300. A switch pressure plate 302 is attached at the corners to the switch mounting plate 300 by means of bolt 304 and nut 308 hardware. A large area seat pressure plate 318 is attached to the switch pressure plate 302 by means of a spacer 316. Each bolt 304 has a spring 306 mounted concentrically around it to allow the switch pressure plate 302 to press downward on the switch push button 314 when a baby or child is sitting on the seat cushion, thereby enabling the seat cushion pressure switch 30 and to cause the switch to return to the inhibited position when the child is removed from the seat. A seat cushion switch cable 42 connects to switch terminals 312 for coupling the pressure switch signal to the micro-controller unit 32.

Figure 4:
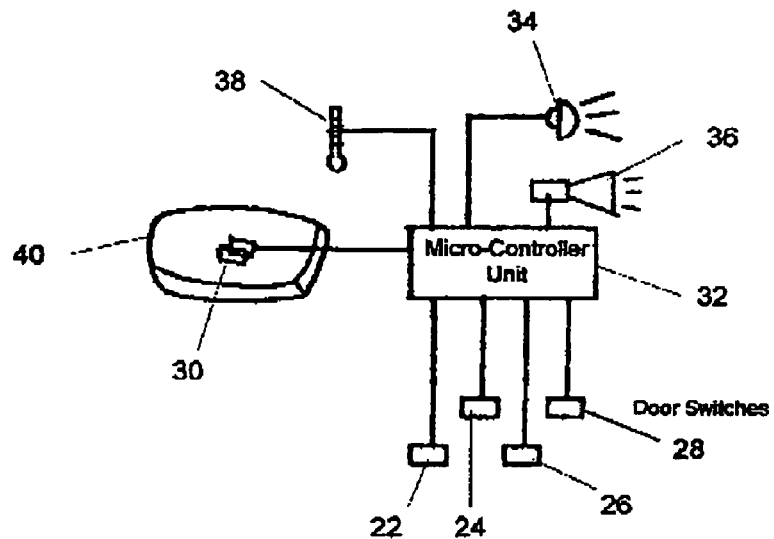
FIG. 4 is a schematic diagram of the occupant detection and notification system with additional vehicle inside temperature sensing capability of the preferred embodiment of the present invention.

FIG. 4 is a schematic diagram of the preferred embodiment of the occupant detection and notification system of the present invention with additional vehicle inside temperature sensing capability. This shows a micro-controller unit 32 with input signals connected from the vehicle's door switches 22–28 and from the seat cushion pressure switch means 30. An output from the micro-controller unit is coupled to an internal vehicle alarm 34 for gaining the attention of responsible occupants of the vehicle when exiting the vehicle. At least the door switch 22 at the front driver's side needs to be coupled to the micro-controller unit but typically switches from all vehicle passenger doors would be coupled to the micro-controller unit. An additional and very important inside temperature sensor 38 is also coupled to the micro-controller unit 32 with a second output from the micro-controller unit 32 driving an external (security type) vehicle alarm that has the audible volume to gain the attention of people in the surrounding vicinity of the vehicle. The internal vehicle alarm 34 can be a beeper, a voice command, or other desired audio sound loud enough to get the attention of a person exiting the vehicle. This alarm can be added to the vehicle or an existing internal alarm, such as that used to indicate that the lights are on or the key is left in the ignition. The external vehicle alarm can be the same as the security alarm built in a vehicle. A minimum embodiment of the system would include only the internal notification features.

Figure 5:
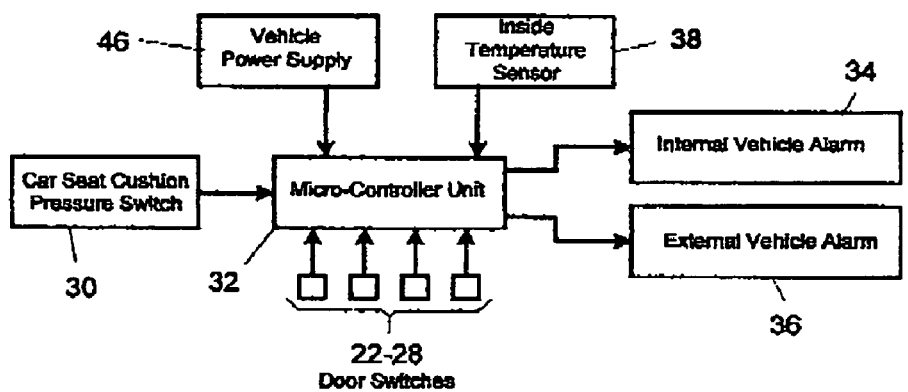
FIG. 5 is a block diagram of the occupant detection and notification system of the present invention.

FIG. 5 is a block diagram of the occupant detection and notification system of the present invention, which summarizes the system as discussed above. Here the cushion pressure switch 30, door switches 22–28, inside temperature sensor 38, and vehicle power supply 46 are shown coupled to inputs of the micro-controller unit 32. Outputs from the micro-controller unit 32 are then coupled to the internal vehicle alarm 34 and the external vehicle alarm 36.

Figure 6:
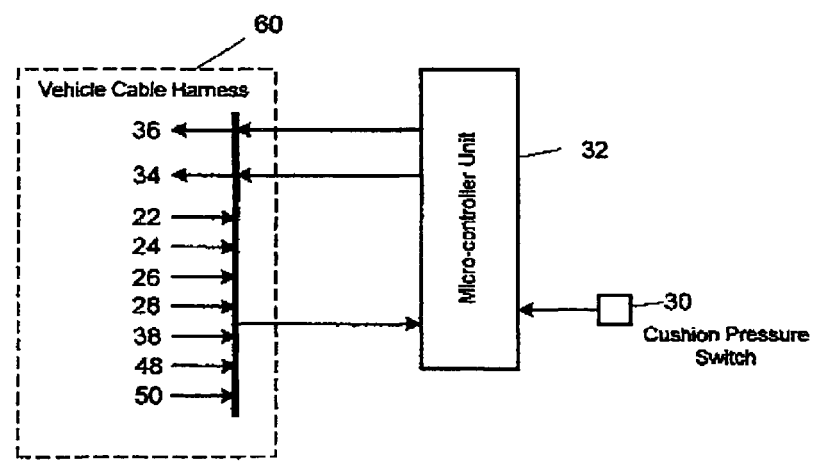
FIG. 6 is a drawing illustrating a cable harness that can be supplied by the vehicle manufacturer for use with the occupant detection and notification system of the present invention.

This system can either be retrofitted to a vehicle or various portions of the system could be supplied by a vehicle manufacturer at a reasonably small cost FIG. 6 is a drawing illustrating a vehicle cable harness 60 that could be supplied by a vehicle manufacturer for use with the occupant detection and notification system of the present invention. This vehicle cable harness 60 routes signals from the already available components in the vehicle; e.g. door switches 22–28, inside temperature sensor 38, positive voltage 48, and chassis ground 50 to a micro-controller unit 32, that is added in the vehicle 12 in close proximity or on the child car seat 16. The cable harness also carries output signals from the micro-controller unit 32 to the internal vehicle alarm 34 and the external vehicle alarm 36. This vehicle cable harness 60 would come out of the rear seat of the vehicle at one or more locations to allow quick connection to the cushion pressure switch 30 of one or more child car seats.

Figure 7:
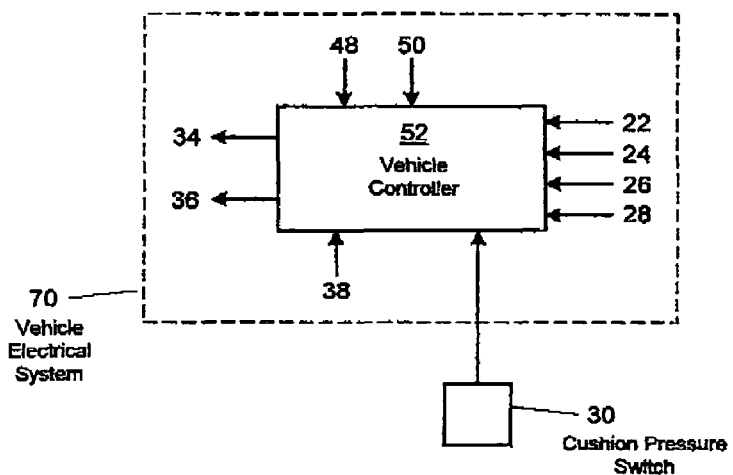
FIG. 7 is a drawing illustrating the complete system of the present invention that can be supplied by the vehicle manufacturer where only a child car seat needs to be plugged into the system.

Similarly, FIG. 7 is a drawing illustrating the system of the preferred embodiment of the present invention where the vehicle manufacturer supplies everything except the child car seat, with only the seat cushion pressure switch 30 being plugged into the built-in vehicle electrical system's micro-controller 70 to easily and quickly complete installation of the system. In this preferred embodiment one of the vehicle's existing micro-controllers is used to control the system. As shown, the door switches 22–28, the inside temperature sensor 38, positive voltage 48, and chassis ground 50 are inputs to the vehicle's controller 52 and outputs from the micro-controller are coupled to the internal vehicle alarm 34 and external vehicle alarm 36. Most of these connections are likely to already exist or should be able to be made at a nominal cost. In this case only a small cable carrying the cushion pressure switch 30 to the vehicle's micro-controller 52 is required to complete the system.

Figure 8:
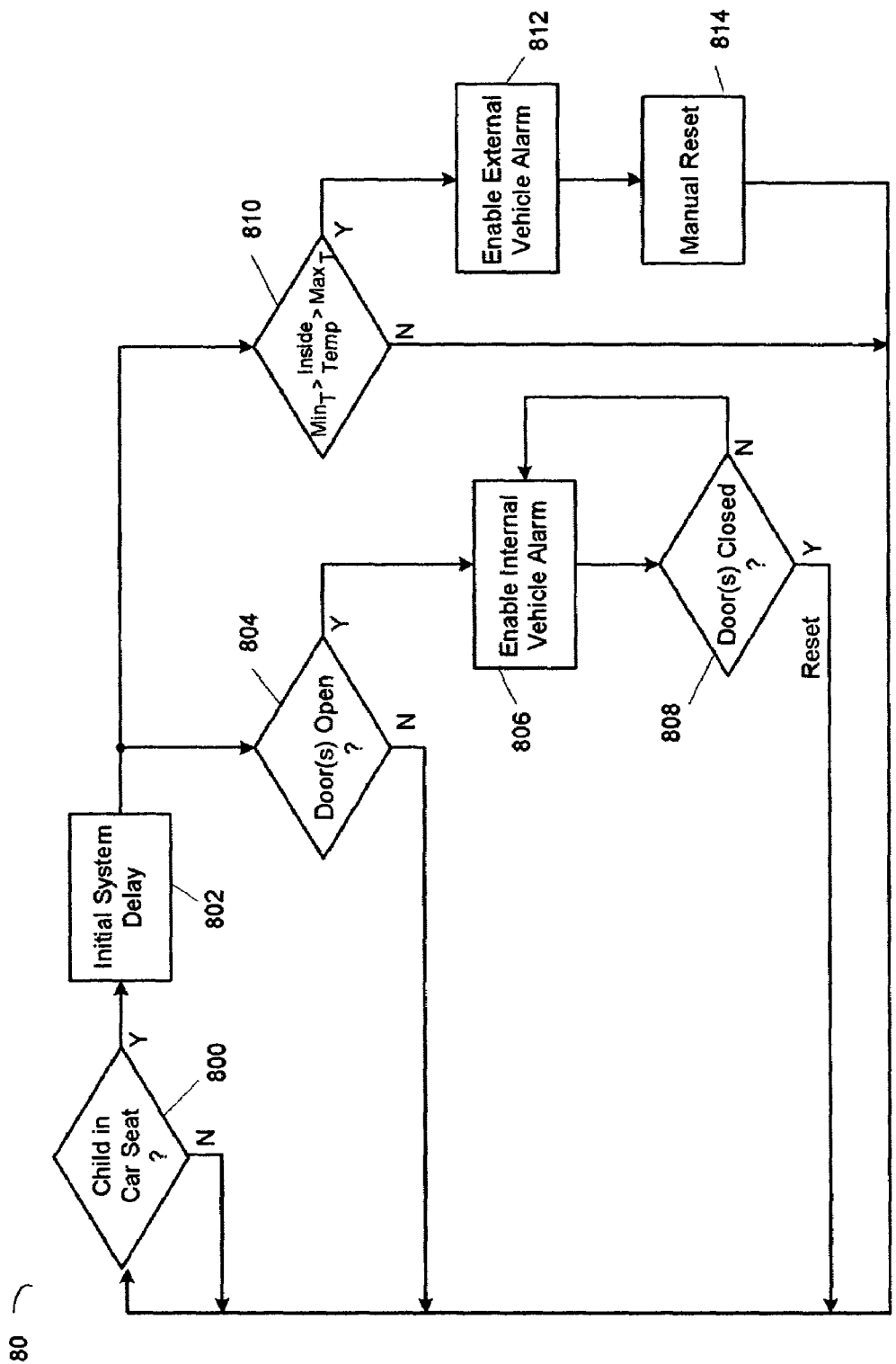
FIG. 8 is a flow diagram illustrating the operation of the occupant detection and notification system of the present invention.

FIG. 8 describes the use of the occupant detection and notification system of the present invention by means of a system flow diagram 80. The micro-controller unit of the present invention is programmed to carry out the control functions specified in the flow diagram of FIG. 8. The child in car seat block 800 is used to determine if the child car seat 16 is occupied or not. If not, the system remains inhibited. As soon as a child is placed in the child car seat 16 the initial system delay block 802 is triggered delaying the enablement of the system for a preset time to allow other people to get in the vehicle and the doors to be shut. Once all occupants are in the vehicle, it is assumed that the inside environment will be maintained at a safe temperature. When the vehicle is parked, the door(s) open block 804 detects when at least one of the passenger doors 14 is opened and triggers the enable internal alarm block 806, which in turn enables the internal vehicle alarm 34 to give a voice command, or other signal, thereby notifying the driver and/or other passengers that there is a child onboard. This alarm continues to sound until the child is removed from the car seat or the door(s) closed block 808 detects that all door(s) are in fact closed and resets the system turning off the inside notification alarm.

If in the event, for whatever reason, a baby or small child is left in the vehicle strapped in the child car seat, as the temperature rises or falls to an unsafe temperature, this condition is sensed by the inside temperature block 810 and triggers the external alarm block 812, which enables the very loud external vehicle alarm 36 until someone hears it and comes to the aid of the child. This alarm can only be turned off by removing the child from the child car seat or by means of the manual reset function block 814.

While a preferred embodiment of the occupant detection and notification system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, various logic circuit or micro-controllers can be used to implement the control functions of the system. Also, various types of cushion pressure switch means can be used to indicate that the child car seat is occupied.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for detecting and notifying that a child has been abandoned in a vehicle, comprising:
  providing an occupant detection and notification system for installation in a vehicle, said occupant detection and notification system further comprising:
    a child car seat being attachable in a seat of a vehicle, said child car seat having a safety belt means for securing a child, said child car seat further having a built-in seat cushion pressure switch means, said pressure switch means being enabled when a child occupies said child car seat
    a micro-controller unit for controlling said vehicle occupant detection and notification system attachable to said child car seat, said micro-controller unit being operable to monitor said micro-controller unit's inputs from multiple sensors within a vehicle and to provide output enabling signals to alarms mounted internally and/or externally to said vehicle;
    a door switch being mountable on at least the driver's door of said vehicle, the output signal from said door switch being mutable to one of said inputs of said micro-controller unit for indicating when said door is open;
    an inside vehicle temperature sensor, the output signal from said inside temperature sensor being mutable to an additional input of said micro-controller unit for determining when the temperature inside said vehicle falls above or below a predetermined said temperature range;
    an internal vehicle alarm being mountable in said vehicle for reminding responsible occupants of said vehicle that a child is in said child car seat and a door of said vehicle is open, said internal vehicle alarm being enabled by an output signal from said micro-controller unit;
    a high-volume audible external vehicle alarm, said external vehicle alarm being enabled by an output of said micro-controller unit when a child is in said car seat and the inside temperature of said vehicle is outside of said predetermined safe temperate range, said external alarm being reset when said child is removed from said child car seat or manually; and
    a wiring harness for routing signal wires from said seat cushion pressure switch means of said child car seat, said door switches, said inside temperature sensor, and vehicle's power and chassis ground to inputs of said micro-controller unit, and front said micro-controller unit outputs to said internal vehicle alarm and said high volume audible external alarm, said wiring harness wires having a mating connector means; and
  sequentially performing the step-by-step operational functions of said system according to the sequential steps, comprised of:
  step 1, determining when a child occupies said child car seat, by means of monitoring the state of said cushion pressure switch;
  step 2, enabling said system once responsible occupants are in said vehicle and all doors are closed, by means of monitoring the state of said door switch(es);
  step 3, detecting when a door of said vehicle is opened, by means of monitoring the state of said door switch(es);
  step 4, enabling an internal audible alarm or voice message stating that said child is in said child car seat, by means of an output enabling signal from said micro-controller unit;
  step 5, inhibiting said system if said child is removed from said child car seat, determined by monitoring the state of said cushion pressure switch;
  otherwise, if said child is left unattended in said child car seat:
  step 6, sensing the internal temperature inside said vehicle if said child is left in said child car seat inside said vehicle, by means of monitoring said inside vehicle temperature sensor;

step 7, triggering said external vehicle alarm until someone comes to the aid of said child when vehicle inside temperature reaches an unsafe temperature, by means of by means of an output enabling signal from said micro-controller unit; and step 8, resetting said system when said child is safely removed from said vehicle.

2. The method of claim 1, wherein said seat cushion is a separate removable cushion with built-in pressure switch means for retrofitting in an existing child car seat, said separate removable seat cushion being securely affixed to said child seat by attaching means.

3. The method of claim 1, wherein said micro-controller unit is an integral part of said child car seat.

4. The method of claim 1, wherein said wiring harness supplies signals from a plurality of child car seats to multiple inputs of said micro-controller.

5. A method for detecting and notifying that a child has been abandoned in a vehicle, comprising:

providing a child detection and notification system in combination with a vehicle, said child detection and notification system further comprising;

a child car seat being attached in a seat of said vehicle, said child car seat having a safety belt means for securing a child, said child car seat further having a built-in seat cushion with pressure switch means, said pressure switch means being enabled when a child occupies said child car seat;

a micro-controller unit for controlling said vehicle occupant detection and notification system, said micro-controller unit being operable to monitor said micro-controller unit's inputs from multiple sensors within a vehicle and to provide output enabling signals to internal and external vehicle alarms;

signals from at least the vehicle's driver-side front passenger door switch routed to an input of said micro-controller unit for indicating when one or more doors are open;

an inside vehicle temperature sensor, the output signal from said inside temperature sensor being routable to an additional input of said micro-controller unit for determining when the temperature inside said vehicle falls above or below a predetermined safe temperature range;

an internal vehicle alarm mounted in said vehicle for reminding responsible occupants of said vehicle, when a child is in said child car seat and a door of said vehicle is open, that a child is in said child car seat, said internal vehicle alarm being enabled by an output signal from said micro-controller unit;

a high-volume audible external vehicle alarm, said external vehicle alarm being enabled by an output of said micro-controller unit when a child is in said car seat and the inside temperature of said vehicle is outside of said predetermined safe temperate range, said external alarm being reset when said child is removed from said child car seat or manually; and a wiring harness routing signal wires from said seat cushion pressure switch means of said child car seat, said door switches, said inside temperature sensor, and vehicle's power and chassis ground to inputs of said micro-controller unit, and from said micro-controller unit outputs to said internal vehicle alarm and said high volume audible external alarm, said wiring harness wires having a mating connector means; and sequentially performing the step-by-step operational functions of said system according to the sequential steps, comprised of:

step 1, determining when a child occupies said child car seat, by means of monitoring the state of said cushion pressure switch;

step 2, enabling said system once responsible occupants are in said vehicle and all doors are closed, by means of monitoring the state of said door switch(es);

step 3, detecting when a door of said vehicle is opened, by means of monitoring the state of said door switch(es);

step 4, enabling an internal audible alarm or voice message stating that said child is in said child car seat, by means of an output enabling signal from said micro-controller unit step 5, inhibiting said system if said child is removed from said child car seat, determined by monitoring the state of said cushion pressure switch;

otherwise, if said child is left unattended in said child car seat:

step 6, sensing the internal temperature inside said vehicle if said child is left in said child car seat inside said vehicle, by means of monitoring said inside vehicle temperature sensor;

step 7, triggering said external vehicle alarm until someone comes to the aid of said child when vehicle inside temperature reaches an unsafe temperature, by means of an output enabling signal from said micro-controller unit; and step 8, resetting said system when said child is safely removed from said vehicle.

6. The method of claim 5, wherein said micro-controller unit is an integral part of said child car seat.

7. The method of claim 5, wherein the micro-controller unit functions are provided by a controller of said vehicle's built-in electrical system.

8. The method of claim 5, wherein the output signal from a temperature sensor inside said vehicle is coupled to an additional input of said micro-controller unit for determining when the temperature inside said vehicle falls above or below a predetermined safe temperature range.

9. The method of claim 5, wherein said external vehicle alarm is said vehicle's existing security alarm.

10. The method of claim 5, wherein said internal vehicle alarm is said vehicle's beeper normally used to indicate that the lights are on or that the keys are in the ignition.

11. The method of claim 5, wherein said seat cushion is a separate removable cushion with built-in pressure switch means for retrofitting in an existing child car seat, said separate removable seat cushion being securely affixed to said child seat by attaching means.

* * * * *